(12) United States Patent  
Faaborg et al.

(10) Patent No.: US 11,941,342 B2
(45) Date of Patent: Mar. 26, 2024

(54) TEXT LAYOUT INTERPRETATION USING EYE GAZE DATA

(71) Applicant: Google LLC, Mountain View, CA (US)

(72) Inventors: Alexander James Faaborg, Mountain View, CA (US); Brett Barros, San Mateo, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/804,242

(22) Filed: May 26, 2022

(65) Prior Publication Data

US 2022/0284168 A1 Sep. 8, 2022

Related U.S. Application Data

(63) Continuation of application No. 17/310,977, filed as application No. PCT/US2020/070650 on Oct. 9, 2020, now Pat. No. 11,347,927.

(51) Int. Cl.
| | |
|---|---|
| *G06K 9/00* | (2022.01) |
| *G06F 3/01* | (2006.01) |
| *G06F 18/21* | (2023.01) |
| *G06F 18/214* | (2023.01) |
| *G06F 40/106* | (2020.01) |
| *G06F 40/30* | (2020.01) |
| *G06V 30/412* | (2022.01) |

(Continued)

(52) U.S. Cl.
CPC ........... *G06F 40/106* (2020.01); *G06F 3/013* (2013.01); *G06F 18/214* (2023.01); *G06F 18/217* (2023.01); *G06F 40/30* (2020.01); *G06V 30/412* (2022.01); *G10L 13/02* (2013.01); *G06V 30/10* (2022.01)

(58) Field of Classification Search
CPC ........................................................ G06F 3/013
See application file for complete search history.

(56) References Cited

U.S. PATENT DOCUMENTS

| 6,195,640 B1 | 2/2001 | Mullaly et al. |
| 9,569,701 B2 * | 2/2017 | Hartley .................. G06V 20/20 |
| 10,082,864 B2 | 9/2018 | Kristensson et al. |

(Continued)

FOREIGN PATENT DOCUMENTS

| CN | 106999337 A | 8/2017 |
| CN | 107077201 A | 8/2017 |

(Continued)

OTHER PUBLICATIONS

International Search Report and Written Opinion for PCT Application No. PCT/US2020/070650, dated Jun. 29, 2021, 9 pages.

(Continued)

*Primary Examiner* — Hadi Akhavannik
(74) *Attorney, Agent, or Firm* — Brake Hughes Bellermann LLP

(57) ABSTRACT

Gaze data collected from eye gaze tracking performed while training text was read may be used to train at least one layout interpretation model. In this way, the at least one layout interpretation model may be trained to determine current text that includes words arranged according to a layout, process the current text with the at least one layout interpretation model to determine the layout, and output the current text with the words arranged according to the layout.

19 Claims, 8 Drawing Sheets

(51) Int. Cl.
*G10L 13/02* (2013.01)
*G06V 30/10* (2022.01)

(56) References Cited

U.S. PATENT DOCUMENTS

| | | | |
|---|---|---|---|
| 10,317,992 | B2 | 6/2019 | Prokofieva et al. |
| 10,726,473 | B1* | 7/2020 | Graham ............ G06Q 30/0226 |
| 10,732,708 | B1* | 8/2020 | Roche ................... G10L 15/22 |
| 10,810,966 | B1* | 10/2020 | Landgraf .............. H04N 7/188 |
| 10,878,237 | B2 | 12/2020 | Rougeaux et al. |
| 10,996,751 | B2 | 5/2021 | Mohlin et al. |
| 2015/0324645 | A1 | 11/2015 | Jang et al. |
| 2016/0299661 | A1* | 10/2016 | Alpert ..................... G06T 17/05 |
| 2017/0160813 | A1 | 6/2017 | Divakaran et al. |
| 2017/0322679 | A1 | 11/2017 | Gordon |
| 2017/0351326 | A1 | 12/2017 | Aarts et al. |
| 2019/0043236 | A1* | 2/2019 | Jones ..................... G06F 40/58 |

FOREIGN PATENT DOCUMENTS

| | | |
|---|---|---|
| CN | 107209552 A | 9/2017 |
| CN | 109690553 A | 4/2019 |
| CN | 111522430 A | 8/2020 |
| JP | 2005122690 A | 5/2005 |
| JP | 2016173803 A | 9/2016 |
| JP | 2018533782 A | 11/2018 |
| KR | 20120053803 A | 5/2012 |
| KR | 20140147057 A | 12/2014 |

OTHER PUBLICATIONS

First Office Action with English translation for Chinese Application No. 202080026203.1, dated Nov. 24, 2022, 12 pages.

Office Action for Japanese Application No. 2021-564645, dated Oct. 25, 2022, 6 pages.

Office Action for Korean Application No. 10-2021-7030761 (with English Translation), dated Aug. 21, 2023, 16 pages.

\* cited by examiner

TEXT LAYOUT INTERPRETATION USING EYE GAZE DATA

CROSS-REFERENCE TO RELATED APPLICATIONS

This application is a continuation of, and claims the benefit to, U.S. patent application Ser. No. 17/310,977, filed on Sep. 2, 2021, and issued as U.S. patent Ser. No. 11,347,927 on May 31, 2022, entitled "TEXT LAYOUT INTERPRETATION USING EYE GAZE DATA", which is a 35 U.S.C. § 371 National Phase Entry Application from PCT/US2020/070650, filed on Oct. 9, 2020, entitled "TEXT LAYOUT INTERPRETATION USING EYE GAZE DATA", the entire contents of which are incorporated herein by reference in their entirety.

TECHNICAL FIELD

This description relates to machine learning techniques for understanding text.

BACKGROUND

Written language typically has a default layout or order. For example, within a particular document, text may be expressed from left-to-right, and/or from top-to-bottom.

Optical character recognition (OCR) and related techniques have been developed for receiving written text visually (e.g., using a camera), and expressing the received text in an alternate format. For example, OCR techniques may be used to provide editable text from non-editable text, or to provide an audible reading of the text using text-to-speech (TTS) techniques.

In many cases, however, visual text does not follow a default or easily-discernable layout or order. In such cases, OCR, TTS, and related techniques may provide incorrect outputs, or have other undesirable outcomes.

SUMMARY

According to one general aspect, a computer program product may be tangibly embodied on a non-transitory computer-readable storage medium and may include instructions that, when executed by at least one computing device, are configured to cause the at least one computing device to receive, for training text, gaze data collected from eye gaze tracking performed while the training text was read. The instructions, when executed by the at least one computing device, may be further configured to cause the at least one computing device to train at least one layout interpretation model using the training text and the gaze data. The at least one layout interpretation model may thus be trained to determine current text that includes words arranged according to a layout, process the current text with the at least one layout interpretation model to determine the layout, and output the current text with the words arranged according to the layout.

According to another general aspect, a computer-implemented method may include receiving, for training text, gaze data collected from eye gaze tracking performed while the training text was read, and training at least one layout interpretation model using the training text and the gaze data. The at least one layout interpretation model may thus be trained to determine current text that includes words arranged according to a layout, process the current text with the at least one layout interpretation model to determine the layout, and output the current text with the words arranged according to the layout.

According to another general aspect, a system may include at least one memory including instructions, and at least one processor that is operably coupled to the at least one memory and that is arranged and configured to execute instructions that, when executed, cause the at least one processor to determine current text that includes words arranged according to a layout. The instructions, when executed, may be further configured to cause the at least one processor to process the current text with at least one layout interpretation model to determine the layout, the at least one layout interpretation model being trained using training text and gaze data collected from eye gaze tracking performed while the training text was read, and output the current text with the words arranged according to the layout.

The details of one or more implementations are set forth in the accompanying drawings and the description below. Other features will be apparent from the description and drawings, and from the claims.

DETAILED DESCRIPTION

Figure 1:
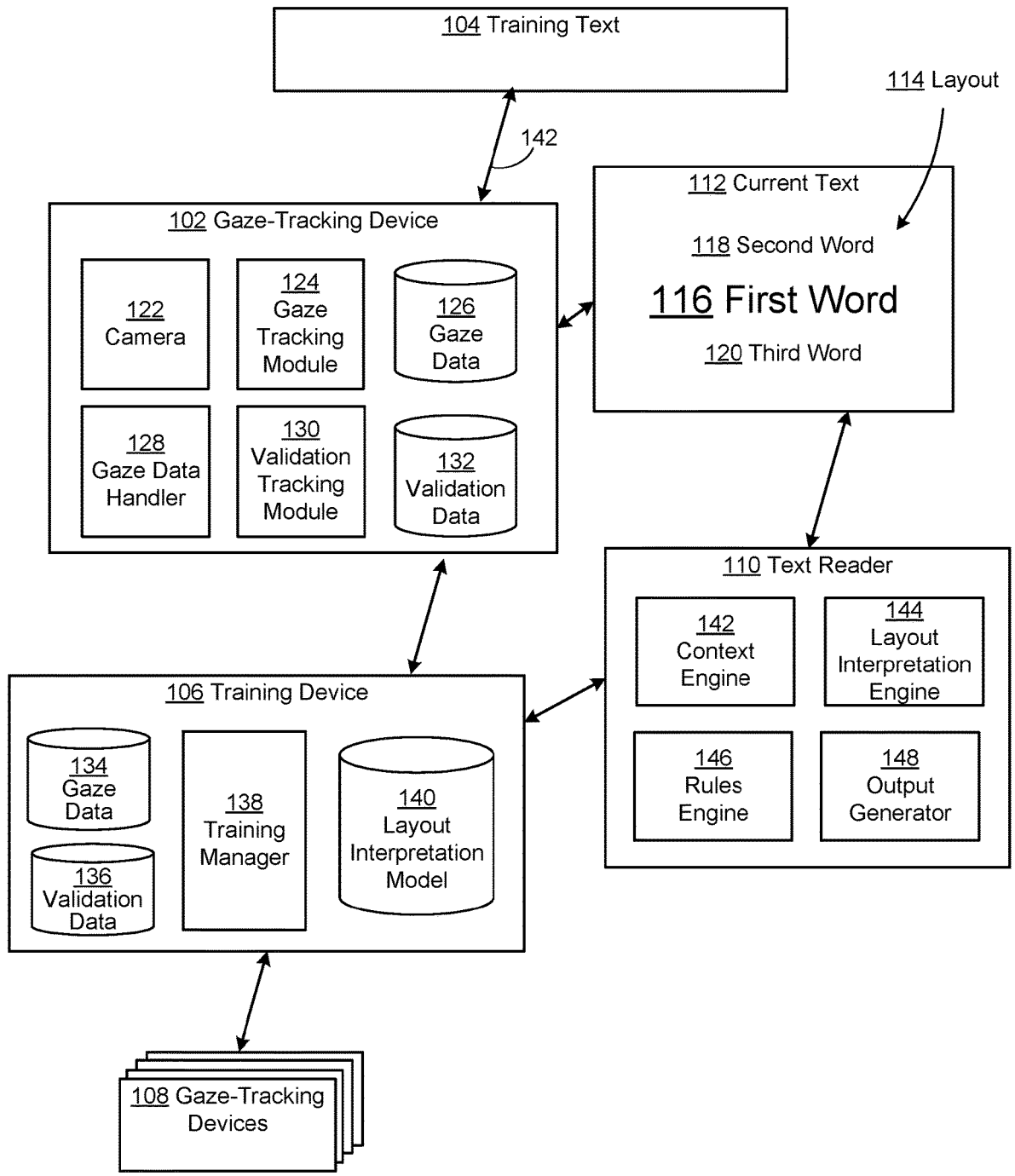
FIG. 1 is a block diagram of a system for text layout interpretation using eye gaze data.

Described systems and techniques enable ease of understanding visual text, e.g., written text, that may be displayed in layouts that do not follow a known, default, or standard layout or order. For example, English language documents may typically be written in a top-to-bottom, left-to-right format, or using some other defined visual hierarchy selected to correspond to an order in which a viewer is likely to process information. However, for various reasons, many instances of text do not follow such a standard or easily-predictable format. In such cases, it becomes difficult or impossible for software to interpret or utilize such text effectively. As a result, outputs attempting to interpret or utilize such text, e.g., audible outputs, may be difficult to understand, or may provide erroneous information to a user.

For example, signs with text advertising goods or services may provide the text with an order designed to capture a user's attention in a particular manner that is thought to increase a likelihood of inducing a purchase of the advertised goods or services. In other examples, a sign layout may be provided in a manner that corresponds to, or provides information about, a proximate physical layout in an area of the sign. For example, a street sign may provide street names or directions corresponding to a nearby physical layout, such as which exit to take from a highway. In other examples, signs within stores (e.g., grocery stores) may be arranged to visually indicate location-based information (e.g., which aisle of the store contains particular types of items, and on which side of an aisle).

In many cases, human users are able to infer an intended meaning from such text, based on context and personal experience. For example, in the examples above, advertisers may design advertisements in precisely a manner thought to capture a consumer's attention with respect to advertised goods/services. Experienced drivers may easily interpret driving directions from posted signs, while shoppers routinely use posted signage to locate items for purchase within stores.

In many cases, however, human users for whom signage and other text was ostensibly designed may nonetheless struggle to understand such text. For example, the text designers may do a poor job of text layout, or users may include non-native speakers, or blind or low-vision users, or other users with physical challenges that make understanding text difficult.

Techniques described herein may be implemented to assist such users, by providing audible or other outputs for visual text, which capture and express an intended meaning (e.g., semantic meaning) of the text. Further, the described techniques may be used to distill, summarize, recognize, or query text, which might otherwise be unavailable for such purposes.

In particular, as described in detail herein, the techniques utilize eye gaze data from a large number of users, and a large quantity of text, to train one or more machine learning (ML) models to automatically recognize and use a suitable layout for reading an instance of text. The trained ML models may then be deployed to assist users in the types of examples just referenced, and in other examples.

For example, many users of smart glasses may routinely read signs and other text, while wearing such smart glasses. When such smart glasses are equipped to perform gaze tracking, and the users read particular text correctly, then the resulting eye gaze data and text may be stored as a labelled training set. As a result, ML models trained using such training data are also able to read the same or similar text correctly in the future. If a suitably large number of such users contribute such training data, the resulting ML models may provide accurate text interpretation in a wide variety of settings and contexts.

It is possible in some instances to construct rules for interpreting text layouts, and such rules may be used to supplement or augment the use of trained ML models. However, it is not feasible to construct a suitable rule set(s) that may be used throughout all available types of advertisements and signs referenced above, much less across all other settings in which the described techniques may be used, including, e.g., menus, posters, newspapers, magazines, books, presentations, and various other types of documents.

In contrast, the described techniques may be implemented in a uniform manner for all such use cases, and others. Moreover, the described techniques may be applicable in such use cases across multiple languages, regions, and other contexts. Further, the described techniques may be implemented inexpensively, and with a high degree of accuracy and reliability.

FIG. 1 is a block diagram of a system for text layout interpretation using eye gaze data. In the example of FIG. 1, a gaze-tracking device 102 is configured to read training text 104. A training device 106 may use resulting gaze data from the gaze-tracking device 102, and similar gaze data from a plurality of gaze-tracking devices 108, to train one or more machine learning models.

Then, a text reader 110 may be enable to read current text 112, even when the current text 112 has a layout 114 that is non-conventional. For example, in the simplified example of FIG. 1, the layout 114 includes a first word 116 that is larger than, and positioned between, a second word 118 and a third word 120. While a human reader may easily infer an intended manner of reading the current text 112 from a content, context, and sizing of the first word 116, second word 118, and third word 120, a conventional machine-based text reader (e.g., typical text reading software) would typically read the current text 112 in a top-to-bottom fashion, as "second word 118, first word 116, third word 120."

Although FIG. 1 provides a single, simplified example of the current text 112, it will be appreciated from the present description that the text reader 110 may be enabled to interpret and read an extremely large and varied number of types of text layouts, in a manner that is fast, convenient, and reliable, and that does not require large amounts of processing power or memory. For example, in addition to the examples provided above, the text reader 110 may be configured to read the current text 112 correctly, even when the layout 114 includes, e.g., columns, headers, footers, footnotes, titles, headings, subheadings, outlines, and captions, with many types of variations in, e.g., text size, color, font, and text emphasis techniques (e.g., bold, underline, italics). The current text 112 may include signs in many different types of physical locations/contexts, as well as various types of web pages, documents, articles, and stories, and including graphs, maps, tables, and charts.

In more detail, the training text 104 may itself include any potential arrangement or layout of text and associated text elements, some of which are referenced above as occurring within the current text 112, as well. A single user of the gaze-tracking device 102 may encounter many different instances of the training text 104, having many different layouts.

For example, the gaze-tracking device 102 may represent a portable, e.g., wearable, device, which may therefore be transported to many different physical locations, as a user of the gaze-tracking device 102 moves from place to place. During such movements, various instances of the training text 104 may be observed and recorded for use by the training device 106.

Moreover, the plurality of gaze-tracking devices 108 represent implementations in which a large number of users each utilize correspondingly large numbers of the plurality of gaze-tracking devices 108. When the plurality of gaze-tracking devices 108 are portable, e.g., wearable, then the training device 106 may be provided with correspondingly large quantities of training data.

In some implementations, one or more of the plurality of gaze-tracking devices 108 may not be portable, as described below. Nonetheless, the training device 106 may be provided with large quantities of a wide variety of training data, resulting in effective training.

As referenced above, the gaze-tracking device 102, and one or more of the plurality of gaze-tracking devices 108, may be implemented as a portable, e.g., wearable, device. For example, the gaze-tracking device 102 may be implemented as a head-mounted device (HMD), e.g., as a pair of smart glasses, such as those illustrated and described below, with respect to FIG. 7. Such an HMD may include any hardware (and associated software) that may be worn on a head of a user and that leverages or utilizes its position on the user's head, and/or that relies on or augments user abilities (e.g., sight, hearing, or head position/orientation) to provide functionality to the user. For example, in addition to smart glasses, the gaze-tracking device 102 may include or represent augmented reality glasses, goggles, a hat, helmet, headband, or other headwear. More generally, the gaze-tracking device 102 may be implemented as any suitable computing device, such as illustrated and described below with respect to FIG. 8, that may be configured to provide the features and functions described herein.

Accordingly, for the sake of brevity and simplicity in the example of FIG. 1, the gaze-tracking device 102 is illustrated with a minimized set of hardware and software features needed to implement the techniques described herein. However, it will be appreciated that any of the hardware and software features of FIGS. 7 and 8, and other hardware and software features not explicitly described therein, may be included, as well, including various types of sensors, displays, and input/output (I/O) elements.

Thus, in various implementations, the gaze-tracking device 102 of FIG. 1 may have a primary purpose(s) or utility for a user thereof. For example, smart glasses may be utilized to provide augmented reality (AR) features for a user. In other implementations, the gaze-tracking device 102 may be implemented as a smart phone, laptop, or personal computer, any of which may be used in any desired or conventional manner by users thereof.

During, or in conjunction with, such primary uses, the gaze-tracking device 102 may be configured to perform the functions described herein in a secondary or supplementary fashion, with minimal or no disruption to the primary uses. For example, a user using augmented reality glasses may wear the augmented reality glasses in various places, and may read various signs and other text that may be observed in such places (some of which may be augmented with additional information, as part of a primary function of the augmented reality glasses). In other examples, a user may read a document displayed on a web page of a personal computer.

In these and other scenarios, a camera 122 of the gaze-tracking device 102 may be used by a gaze tracking module 124, to thereby store gaze data 126. In FIG. 1, any known or future type of gaze-tracking techniques may be used, e.g., in which positions and viewing angles of a user's eye during reading of the training text 104 are detected and recorded. Many different types of eye-tracking and/or gaze-tracking techniques exist, and may conventionally be used, e.g., to track an efficacy of an advertisement or web page design, or for various other purposes.

For example, in some implementations, an infrared (IR) light source of the gaze-tracking device 102 may be used in reflection from a user's eye, as detected by the camera 122, over a period of time that occurs during reading of the training text 104. A same or different camera may be used to capture the training text 104, e.g., may capture an image of the training text 104.

Thus, the gaze data 126 should be understood to include at least an image of the training text 104, as well as stored eye movement data characterized with respect to the image of the training text 104. For example, in a simplified example, in a simplified example, the gaze data 126 may store an image of the training text 104, along with individual words within the training text 104, arranged in an order corresponding to an order in which the user read the training text 104. In other examples, the gaze data 126 may store the image of the training text 104 along with a coordinate system that is also used as a common frame of reference to characterize eye movements with respect to the content of the training text 104 during reading thereof.

In many cases, obtaining a sufficient quantity and quality of training data is a limiting factor in designing and implementing machine learning models and related systems. For example, it may be necessary to instruct and/or compensate users providing training data to an undesirable or infeasible extent. In other examples, it may be straightforward to collect large quantities of training data, but the resulting training data may be of a quality that is too low to enable intended results.

In FIG. 1, however, the described techniques for collecting the gaze data 126 assume, or rely on, the fact that most human readers will read the training text 104 in an intended manner, with little or no additional instruction required. For example, as described herein, a layout of the training text 104 may be designed and implemented precisely to encourage a reader to read the training text 104 in a desired manner and/or to achieve an intended effect. Moreover, as described below, even when some users read the training text 104 incorrectly, it may be possible to identify and filter or remove resulting gaze data, so that the gaze data 126 may be populated with instances in which the training text 104 was read in a correct or intended manner.

Further in FIG. 1, the gaze-tracking device 102 includes a gaze data handler 128 that may be configured to perform various functions with respect to the collection of the gaze data 126, including the initiation and cessation of the collection of the gaze data 126 (or otherwise defining time periods in which gaze data collection occurs), processing of data to be stored as the gaze data 126, and transmitting of the gaze data to the training device 106.

For example, the gaze data handler 128 may be implemented using a low power digital signal processor (DSP) and running as a background service that detects one or more triggers for initiating gaze data collection. For example, when the gaze-tracking device 102 includes wearable glasses, or other types of head-mounted devices (HMDs), the gaze data handler 128 may detect that a user is facing, reading, or otherwise interacting with a sign or other potential instance of the training text 104.

In some implementations, the gaze data handler 128 may use a suitably-trained convolutional neural network (CNN) or other ML algorithm to detect and classify various ones of the types of training text 104 mentioned herein, such as signs, menus, posters, or other types of text. In other examples, the gaze data handler 128 may monitor activity of the gaze tracking module 124 to determine whether and when a user is reading any text, such as the training text 104.

In other implementations, the gaze data handler 128 may respond to a direct or indirect command from the user to initiate gaze data collection. For example, a user may initiate gaze data collection through the use of a button or other I/O functionality of the gaze-tracking device 102, or using a verbal/audible command.

In still other implementations, the gaze data handler 128 may utilize other triggers, such as a current location of the gaze-tracking device 102 (e.g., from a Global Positioning System (GPS) signal, or based on a known location with a store, street, or other type of location). For example, geographic areas may be identified in which very little gaze data has been collected for corresponding training text, in which case the gaze data handler 128 may be more likely to initiate gaze data collection more frequently. Conversely, in geographic areas in which a large quantity of gaze data has been collected for corresponding training text, the gaze data handler 128 may be less likely to initiate gaze data collection.

The gaze data handler 128 may control gaze data collection based on other factors, as well. For example, gaze data collection may be less likely when a battery power of the gaze-tracking device 102 is low, or when ambient lighting (or other readability conditions) is poor.

Additionally, the gaze data handler 128 may be configured to manage registrations and opt-in/opt-out requests of the user of the gaze-tracking device 102. For example, some users may wish to opt in to using the gaze-tracking device 102 for layout training purposes, in order to assist blind or low-vision users who may benefit from correct readings of the current text 112, or other users who would benefit from correct readings of the current text 112. However, other users may opt out from some or all participation in gaze data collection for layout training purposes. In some cases, the gaze data handler 128 may be included in an application downloaded to the gaze-tracking device 102 for purposes of gaze data collection for layout training.

The gaze-tracking device 102 is also illustrated as including a validation tracking module, which may utilize and/or store validation data 132. For example, the validation data 132 may represent any data collected in conjunction with the gaze data 126, which may be useful in validating an accuracy, quality, or other aspect of the gaze data 126.

For example, the validation tracking module 130 may collect data tracked by various sensors or other data sources of the gaze-tracking device 102. Example sensors and tracked data may include GPS or other location data, image data captured using the camera 122, or audio data captured by audio sensors. The validation data 132 may be captured concurrently with, or immediately preceding or following, capture of the gaze data 126.

For example, as described herein, the training text 104 may have a text layout that is defined in conjunction with a surrounding physical layout in which the training text 104 is displayed. In some implementations, the training text 104 may be included in a sign that is positioned to provide directions with respect to a physical environment of the sign.

In such examples, the training text 104 may include left-side text providing directions with respect to a physical left side of the sign on which the training text 104 is displayed, and may include right-side text providing directions with respect to a physical right side of the sign on which the training text 104 is displayed. As the gaze data 126 is collected, the validation tracking module 130 may then track subsequent movements of the user. When performed for multiple users and/or over a period of time, it becomes possible to validate that a user who focuses on left-side text tends to proceed toward the left side of the sign in question, thereby validating the directional aspects of the training text 104.

The validation data 132 may also be useful in supplementing or augmenting the gaze data, in ways that enable better or additional functionality by the text reader 110, as described in detail, below. For example, when the current text 112 is included in a sign having directional aspects as in the above example, the text reader 110 may be provided with an ability to perform TTS, including audible indications to a user of the text reader 110 describing such directional aspects. Other examples of the validation data 132, and potential uses thereof, are provided in more detail, below.

The training device 106 may thus store gaze data 134 representing gaze data obtained from the gaze data 126 of the gaze-tracking device 102, as well as similar gaze data obtained from the various gaze-tracking devices 108. Similarly, validation data 136 may be aggregated from the validation data 132, as well as similar validation data obtained from the various gaze-tracking devices 108.

Consequently, a training manager 138 of the training device 106 may be provided with large quantities of high quality training data, which may be frequently updated and expanded as users collect more gaze data 134 and validation data 136. The training manager 138 may thus be configured to provide one or more layout interpretation model(s) 140. For example, the training manager 138 may utilize any suitable type of supervised, unsupervised, or semi-supervised machine learning algorithm, or combinations thereof, which may be parameterized using the gaze data 134 and the validation data 136, to obtain the layout interpretation model 140(s).

Then, when the text reader 110 encounters the current text 112, or any text to be read, the text reader 110 may be configured to utilize the layout interpretation model(s) 140 to read the current text 112 in a correct manner. In the example of FIG. 1, the text reader 110 includes a context engine 142 that may be configured to determine a current context of the current text 112, and/or of the text reader 110.

For example, the context engine 142 may determine a physical context in which the current text 112 is displayed. As described above, such physical contexts may be determined using GPS coordinates to define a physical location, or other contextual data. For AR glasses, physical objects or locations may be tagged, and such tags may also be used.

As with the gaze data handler 128, the context engine 142 may similarly determine a presence of the current text 112, based on detecting a user's extended gaze and/or associated activities (e.g., eye gaze data) indicating an attempt or desire to read the current text 112. Also similarly, it may be possible for a user to provide a direct or indirect request for the text reader 110 to read the current text 112, including an identification by the user of a sign or other medium on which the current text 112 is displayed.

A layout interpretation engine 144 may then leverage the layout interpretation model(s) 140 to read the current text 112 in a correct manner, e.g., according to an inferred layout of the current text. In some implementations, the layout interpretation engine 144 may utilize context information from the context engine 142 to facilitate, or supplement, such layout inferences.

Similarly, a rules engine 146 may be utilized to assist operations of the layout interpretation engine 144, perhaps in conjunction with contextual outputs of the context engine 142. For example, the rules engine 146 may provide an initial classification of the current text 112, and/or of the contextual information provided by the context engine 142, which may be used by the layout interpretation engine 144 to select a particular layout interpretation model of the layout interpretation model(s) 140.

In some implementations, then, the context engine 142 and/or the rules engine 146 may be configured to provide coarse-grained or high-level control of layout interpretations. For example the context engine 142 and/or the rules engine 146 may determine that the user has entered a type of store, or is driving on a highway, so that the layout interpretation engine 144 may select one or more corresponding layout interpretation model(s) 140 for those types of environments.

In particular, the layout interpretation model(s) 140 may be annotated using the validation data 136 to indicate suitability for such different types of environments. In this way, the layout interpretation engine 144 may easily determine suitable ones of the layout interpretation model(s) 140 for reading the current text 112.

As referenced above, the context engine 142 may also be implemented using one or more machine learning algorithms. For example, the training manager 138 may train corresponding context models, using the validation data 136, so that the context engine can accurately and easily infer a correct context of the current text. Meanwhile, in the example of FIG. 1, the rules engine 146 may be implemented as a simple collection of rules that enable fast selection of an appropriate layout interpretation model(s) 140 by the layout interpretation engine 144.

Finally in the example of FIG. 1, an output generator 148 represents any suitable hardware or software for outputting a reading of the current text 112, with the layout determined by the layout interpretation engine 144. For example, the output generator 148 may include a TTS module and associated audio hardware, or may be configured to output editable text using suitable visual/display hardware.

In some implementations, the output, read text may be stored as part of a search corpus, to thereby become available for potential inclusion in response to received queries against the search corpus. In this way, for example, search reports may be produced, and/or content extraction may be performed, in an accurate manner.

In FIG. 1, the gaze-tracking device 102, the training device 106, and the text reader 110 are implemented as three separate devices and/or modules. In various implementations, the gaze-tracking device 102, the training device 106, and the text reader 110 may be implemented as one or two devices, or as four or more devices.

For example, the training device 106 may represent a collection of servers having large quantities of computing resources, which may be in remote communications with the various gaze tracking devices 102, 108. In this way, the training device 106 may aggregate the gaze data 134 and the validation data 136 for fast and accurate training therewith.

Although the layout interpretation model(s) 140 are illustrated at the training device 106, the text reader 110 may either access the layout interpretation model(s) 140 remotely, and/or may download and store some or all of the layout interpretation model(s) 140 locally. Similarly, the gaze-tracking device 102 need not store the gaze data 126 or the validation data 132 locally, but rather may upload the gaze data 126 or the validation data 132 to the training device 106, as collected.

In general, the text reader 110 may be implemented as one or more of the any of the types of devices referenced with respect to the gaze-tracking device 102, or as other devices. In some examples, the gaze-tracking device 102 and the text reader 110 may be implemented as different types of devices, where the text reader 110 need not perform gaze data collection. For example, the text reader 110 may be implemented as a pair of earbuds, perhaps worn by a blind or low-vision user, which are equipped (perhaps in conjunction with a smartphone or other device) to determine the current text 112 and output an audible rendition thereof, in accordance with a correct layout thereof, to the user.

In other implementations, the gaze-tracking device 102 and the text reader 110 may be implemented as a single device, that both collects gaze data 126 and provides layout interpretation for text reading, as well. For example, a single pair of smart glasses, as in FIG. 7, below, may periodically track and provide gaze data 126 to the training device 106, and then, upon encountering the current text 112, may provide a read-out thereof using previously-trained layout interpretation model(s) 140 that have been trained by the gaze-tracking device 102 itself, as well as by the various other gaze tracking devices 108.

In this regard, it will be appreciated that text referred to herein as the current text 112 may, in some cases, be used as training text for updates to the layout interpretation model(s) 140. Similarly, the training text 104 of FIG. 1 may, at a later time, be read out by the text reader 110 as currently-read text.

Figure 2:
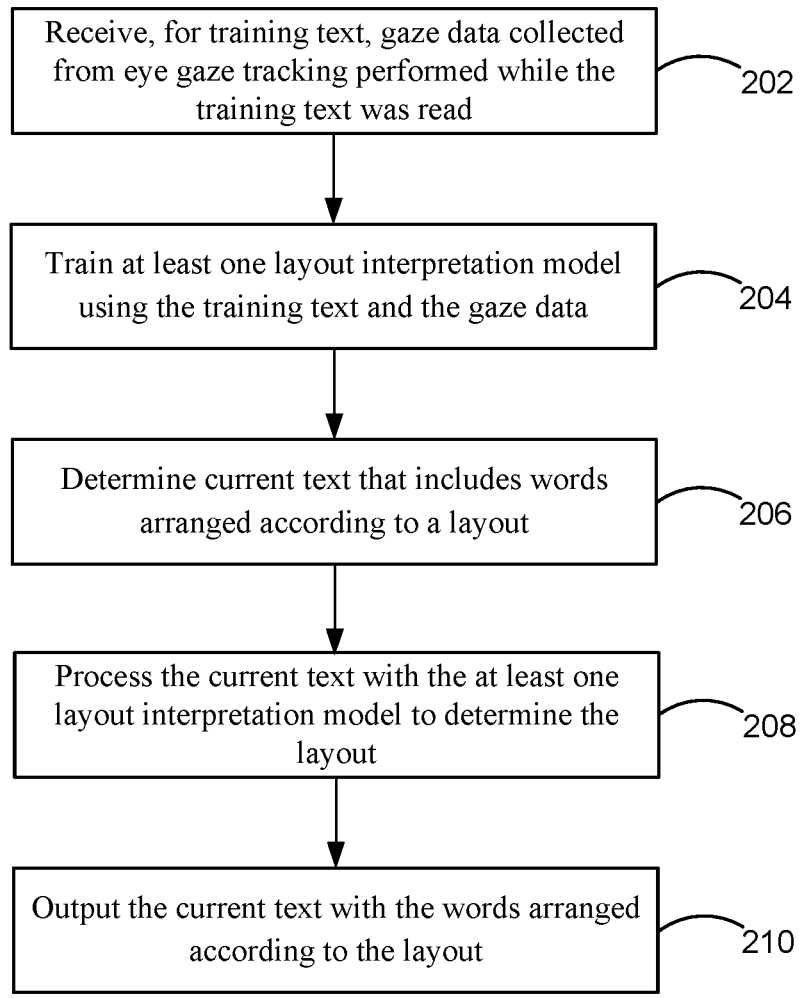
FIG. 2 is a flowchart illustrating example operations of the system of FIG. 1.

FIG. 2 is a flowchart illustrating example operations of the system of FIG. 1. In the example of FIG. 2, operations 202-210 are illustrated as separate, sequential operations. However, in various example implementations, the operations 202-210 may be implemented in an overlapping or parallel manner, and/or in a nested, iterative, looped, or branched fashion. Further, various operations or sub-operations may be included, omitted, or substituted.

In FIG. 2, gaze data collected from eye gaze tracking performed while the training text was read is received (202). For example, the gaze tracking module 124 of FIG. 1 may receive the gaze data 126 collected during a reading of the training text 104, using the camera 122 and related hardware and software. As described, the training text 104 may have an implicit layout that was used by a designer or other provider of the training text 104 to arrange, organize, emphasize, correlate (e.g., with a physical surrounding of the training text), or otherwise present the training text in a desired manner, and for a primary, intended purpose of the training text 104. Since the human user will typically infer or otherwise determine such a layout during reading of the training text 104, the collected gaze data will implicitly reflect the layout.

At least one layout interpretation model may be trained, using the training text and the gaze data (204). For example, the training manager 138 may train the layout interpretation model(s) 140, using the gaze data 126, as well as any other available gaze data within the aggregate gaze data 134 similarly obtained from other gaze-tracking devices 108. Since the gaze data 126 implicitly reflects the layout of the training text 104 as referenced above, the training will inherently capture a nature of the layout, and an effect of the layout on how the training text 104 was read.

Current text that includes words arranged according to a layout may be determined (206). For example, the current text 112 may be detected by the text reader 110. As described, the current text 112, like the training text 104, may have an implicit layout that was used by a designer or other provider of the current text to arrange, organize, emphasize, correlate, or otherwise present the current text 112 in a desired manner.

The current text may be processed with the at least one layout interpretation model to determine the layout (208). For example, the layout interpretation engine 144 may use the layout interpretation model(s) 140 to process the current text 112. As a result of the nature of the training of the layout interpretation model(s) 140, as described above, the processing will result in a correct determination of the original layout, as implicitly included within the current text 112.

The current text may then be output with the words arranged according to the layout (210). For example, the output generator 148 may output the current text 112 with the included words arranged as "first word 116, second word 118, third word 120," even though the actual top-to-bottom order or layout of the current text 112 is "second word 118, first word 116, third word 120," as shown in FIG. 1. As described, the output may include audible text, editable text, and/or stored text included in a search corpus.

Figure 3:
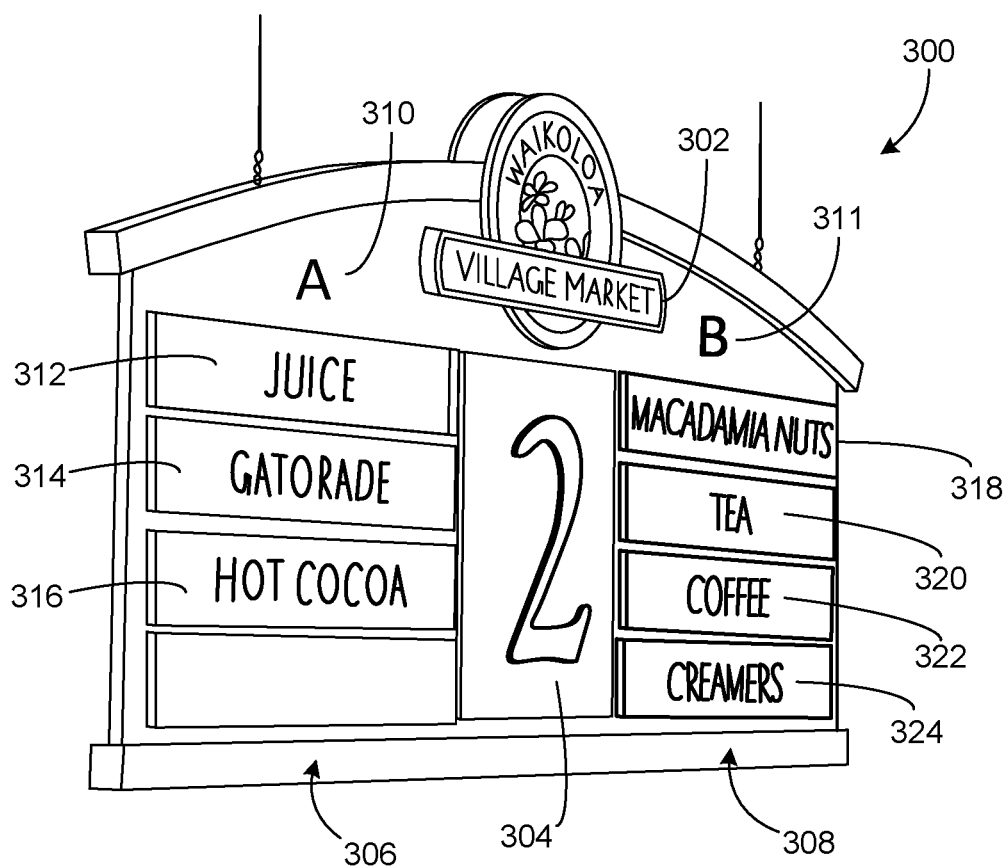
FIG. 3 is first example text that may be processed using the techniques of FIGS. 1 and 2.

FIG. 3 is first example text that may be processed using the techniques of FIGS. 1 and 2. As shown, FIG. 3 includes an aisle sign 300 representing a grocery store aisle sign. As typically occurs with such signs, and signs in other types of stores (e.g., hardware stores, or convenience stores), the aisle sign 300 was designed with a layout intended to convey information about a particular aisle, including types of items included in the aisle, locations of such items within the aisle, a relation of the particular aisle to other aisles in the store, as well as branding information for the store itself.

In the example of FIG. 3, the aisle sign 300 includes a logo 302 identifying the store as "Village Market." In a central, aisle number portion 304 of the aisle sign 300, the aisle sign 300 is identified as being associated with aisle 2. A left side 306 of the aisle sign 300 identifies a first side of the aisle, while a right side 308 of the aisle sign identifies a second side of the aisle. Identifier A 310 identifies the left side of the aisle as side "A", while identifier B 311 identifies the right side of the aisle as side "B." As shown, the side A includes juice 312, Gatorade 314, and hot cocoa 316, while the side B includes macadamia nuts 318, tea 320, coffee 322, and creamers 324.

When viewed as an instance of the training text 104, the aisle sign 300 may be read by a user wearing smart glasses (e.g., as in FIG. 7, below), and gaze data collected from the users' reading of the aisle sign 300 may be collected. For example, the user may ignore the logo 302, because the logo 302 is included for branding purposes of the store, but is not needed for the primary purpose of the aisle sign, i.e., navigating to desired items within the store.

The collected gaze data may then reflect that the user observes the aisle number 304, and then reads elements on the left side 306 from top to bottom (e.g., elements 310, 312, 314, 316), and then reads elements on the right side 308 from top to bottom (e.g., elements 311, 318, 320, 322, 324). In some cases, the user may spend less time on the aisle-side identifiers A 310, B 311, if such information is not helpful in finding a desired item.

As described with respect to FIG. 1, the user's preceding or subsequent actions may be captured and used as validation data 132 of FIG. 1. For example, the user may proceed down aisle 2 and view or select a corresponding item, such as Gatorade 314, and may subsequently purchase such an item. Corresponding data may be collected and saved as validation data 132, and used to validate the fact that the left side 306 of the aisle sign 300 corresponds to a left side of the physical aisle 2 within the store.

For purposes of collecting gaze data for training, it will be appreciated from the example of FIG. 3 that the gaze data 126 of FIG. 1 may include multiple aisle sign instances for a single user. For example, a store may include 10 or more aisles, each having an aisle sign formatted similarly to the aisle sign 300. As the user proceeds through the store, the user may read each of the aisle signs, and the resulting gaze data will reflect the above-described layout of the aisle sign 300. In this way, the training manager 138 may be provided with, e.g., 10 instances of gaze data for training, from a single user in a single store. Thus, from multiple stores and/or multiple users, the training device 106 may be provided with large quantities of gaze data 134, as well as large quantities of validation data 136.

When viewed as an instance of the current text 112, the aisle sign 300 may be read by the text reader 110, in accordance with the layout described above, and reflected in the illustrated sign. For example, the text reader 110 may be included in smart glasses (as in FIG. 7), and may audibly read the text of the aisle sign 300 to a user, e.g., to a blind or low-vision user.

For example, the output generator 148 may identify the aisle sign 300 as corresponding to an aisle, may then ignore the logo 302, and may read out, "aisle 2: left side, juice, Gatorade, hot cocoa; right side, macadamia nuts, tea, coffee, creamers."

The read, output text may also be used in other scenarios. For example, a store may wish to perform traffic analysis of store customers, to improve marketing or physical store layout efforts. By storing text of the aisle sign 300 in a manner that corresponds to an existing layout of the store, resulting traffic data characterizing customer movements within the store may be more easily correlated with the existing layout for analysis.

Figure 4:
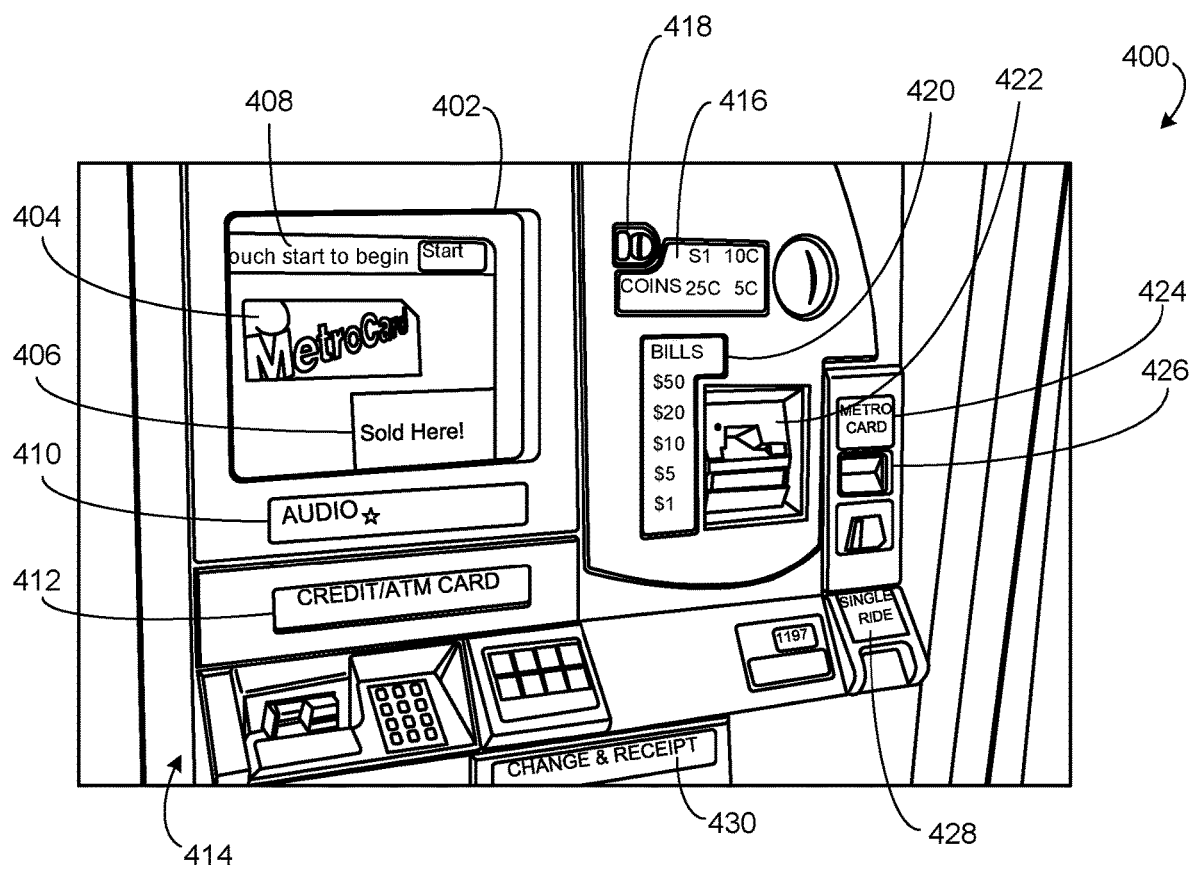
FIG. 4 is second example text that may be processed using the techniques of FIGS. 1 and 2.

FIG. 4 is second example text that may be processed using the techniques of FIGS. 1 and 2. FIG. 4 illustrates a kiosk 400 for purchase of a metro card. A portion 402 includes a screen displaying elements "MetroCard" 404, "Sold Here!" 406, and "touch Start to begin (start)" 408. A portion 410 includes the word "Audio" to initiate an audio interaction with the kiosk (e.g., for blind or low vision users). An element 412 identifies a "credit/atm card" portion 414 of the kiosk. A portion 416 identifying "coins $1 25¢ 10¢ 5¢," adjacent to a coin submission slot 418. Similarly, a portion 420 identifies "Bills $50 $20 $10 $5 $1," adjacent to a bill submission slot 422. An element 424 reads "MetroCard," adjacent to a MetroCard dispenser 426, which is adjacent to a portion 428 for a "Single Ride" MetroCard. Finally in FIG. 4, a portion 430 identifies a "Change & Receipt" portion of the kiosk 400.

When viewed as an instance of the training text 104, the illustrated kiosk signage of FIG. 4, like the aisle sign 300 of FIG. 3, may be understood to provide an instance of corresponding gaze data 126. That is, the gaze tracking module 124 of FIG. 1 may track a user's eye gaze data in reading the portion 402, including reading "MetroCard" 404, followed by "Sold Here!" 406, and followed by "touch Start to begin (start)" 408.

A user paying by credit card, coinage, or bills may then read portion 412, 416, or 420, respectively. User's may then read portions 424, 428 to obtain a resulting MetroCard, and finally may read the portion 430 to receive any change, and a receipt.

As multiple users read the kiosk 400, the aggregate gaze data 134 at the training device 106 may reflect a complete set of training data for the kiosk 400. For example, over time, multiple users will use all of the payment options (e.g., credit card, ATM card, coinage, or bills), so that the training manager 138 will have access to a complete view of the kiosk 400 content.

Interactions of the user with the functionality of the kiosk 400 may provide examples of validation data 132, and validation data 136. For example, user interactions such as touching the screen in the portion 402, or inserting a credit card in the portion 414 (or coins into slot 418, or bills into slot 422), or receiving a MetroCard dispensed from dispenser 426, may be used as validation data.

When viewed as an instance of the current text 112, the kiosk 400 may be read by the text reader 110, in accordance with the layout described above, and reflected in the illustrated signage. Also as with the aisle sign 300 of FIG. 3, the kiosk 400 illustrates that conventional OCR or other conventional text recognition techniques may be unable or unlikely to provide suitably useful output.

The kiosk 400 further illustrates that validation data used in conjunction with training may be used as context or instructional data when the output generator 148 reads the text of the kiosk 400. For example, when reading the coinage portion 416, the output generator 148 may also read an instruction such as, "insert coins into adjacent slot", based on earlier tracking of such an action by a user.

Figure 5:
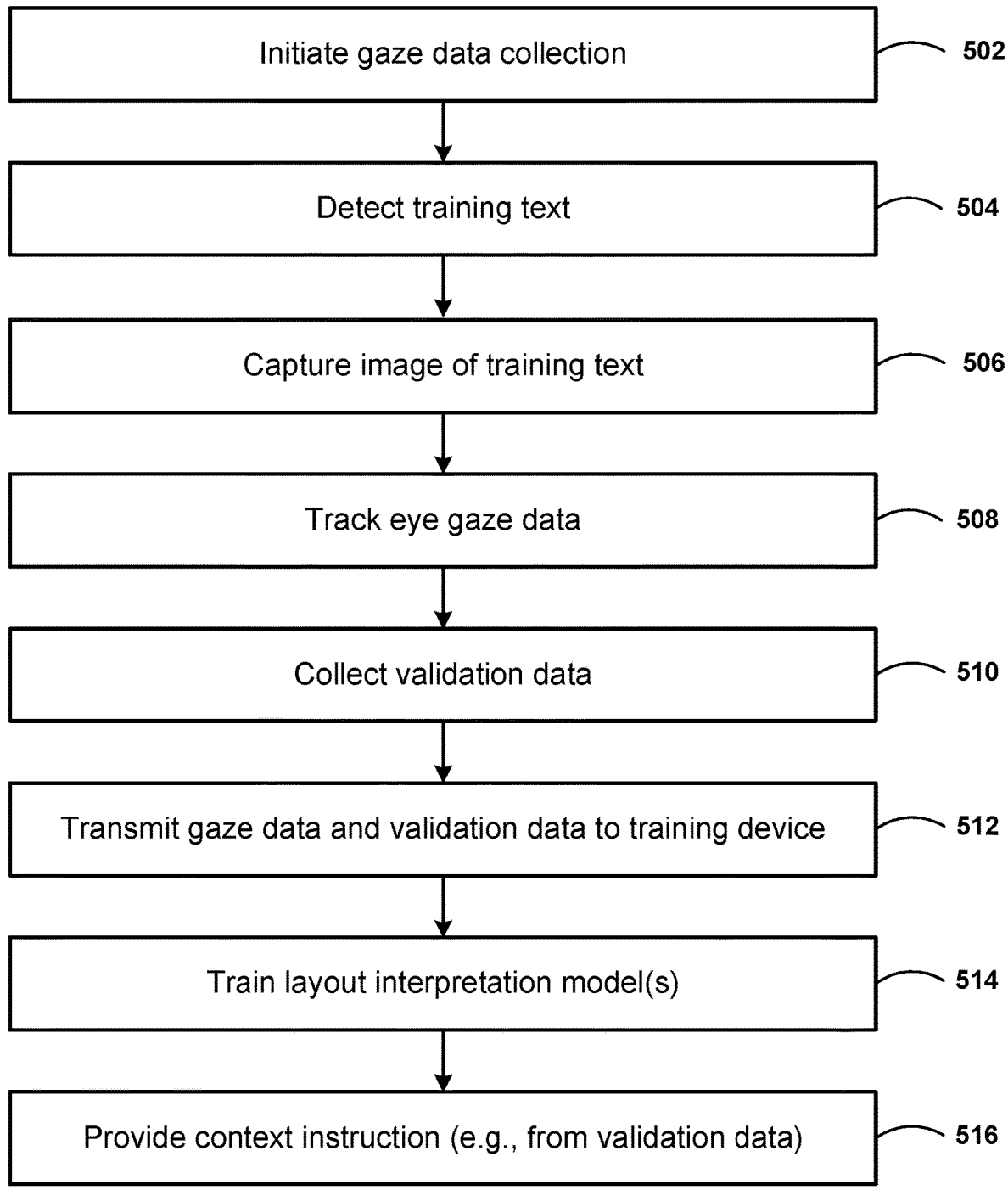
FIG. 5 is a more detailed flowchart illustrating example techniques for training the system of FIG. 1.

FIG. 5 is a more detailed flowchart illustrating example techniques for training the system of FIG. 1. In the example of FIG. 1, gaze data collection is initiated (502) for a user of the gaze-tracking device 102. For example, the gaze data handler 128 may be configured to initiate gaze data collection in various circumstances, or in response to detected or determined environmental triggers.

For example, the gaze data handler 128 may activate the gaze tracking module 124 in response to a user request/activation, or for a pre-determined period of time, or continuously until deactivated by a user. The gaze data handler 128 may activate the gaze tracking module 124 in response to detecting, using the camera 122, a prolonged gaze, e.g., exceeding a pre-determined gaze threshold, of a user with respect to a sign or other text. The gaze data handler 128 may activate the gaze tracking module 124 when the user is in a pre-defined location, such as when the user is in a location known to include signs or other text for which training data is sparse. The gaze data handler 128 may activate the gaze tracking module 124 in response to external considerations, such as availability, or lack of availability, of a power source (e.g., a battery level). The gaze data handler 128 may activate the gaze tracking module 124 in response to opening of a particular application (e.g., a document-scanning application).

Training text may then be detected (504). For example, in some examples just mentioned, the gaze data handler 128 may activate the gaze tracking module 124 for a defined or open-ended gaze data collection window, during which training text may or may not be detected. In other examples, the detection of the training text may be a trigger that initiates the gaze data collection, such as when the gaze data handler 128 detects a prolonged gaze (e.g., exceeding a gaze threshold) of a user on text.

An image of the training text may be captured (506). For example, the camera 122 may capture an image of a sign or other medium in which the training text 104 is provided.

Eye gaze data may be tracked (508) during reading of the training text 104. For example, the gaze tracking module may track the eye gaze data for a defined period of time, or until a gaze of the user is determined to be directed away from the training text 104 for a defined period of time, or to a defined extent.

Validation data may be collected (510). For example, the validation data 132 may be collected from any available sensor or I/O functionality of the gaze-tracking device 102, or from interfacing with other applications that may be running concurrently (e.g., payment applications). Types of validation data 132 to be collected may be defined by, and implemented by, the gaze data handler 128, and may be collected either automatically in conjunction with collection of the eye gaze data, or in response to a user initiation of validation data collection, or in response to detected environmental triggers (e.g., a particular wake word, or a defined movement or action of the user).

Although the validation data collection is shown subsequent to the eye gaze tracking in the example of FIG. 5, validation data 132 may be collected that occurs prior to gaze tracking being initiated, as well. For example, validation data collection may be initiated for a defined period of time, or in response to an environmental trigger that is frequently or typically correlated with a subsequent collection of eye gaze data.

The gaze data 126 and the validation data 132 may then be transmitted to the training device 106 (512). For example, transmission may occur continuously as data is collected, or in batches, or in response to a user initiation of transmission.

Layout interpretation model(s) 140 may thus be trained (514). As described herein, the training manager 138 may be configured to perform training across many different users and instances of aggregated training data, including gaze data 134 and validation data 136. Accordingly, the training manager 138 is able to leverage or exploit patterns that occur across multiple users to reinforce accurate learning on the part of the trained layout interpretation model(s) 140. For example, aspects such as whether text is consumed at all (such as when the "Village Market" logo 302 is ignored) may be reinforced, as well as an order in which information is consumed.

Context instruction may be provided (516), e.g., using the validation data, that may be used by the text reader 110 for future selection and implementation of particular ones of the layout interpretation model(s). The context instruction may be simple rules, or may include separate machine learning algorithms trained, e.g., using the validation data.

Figure 6:
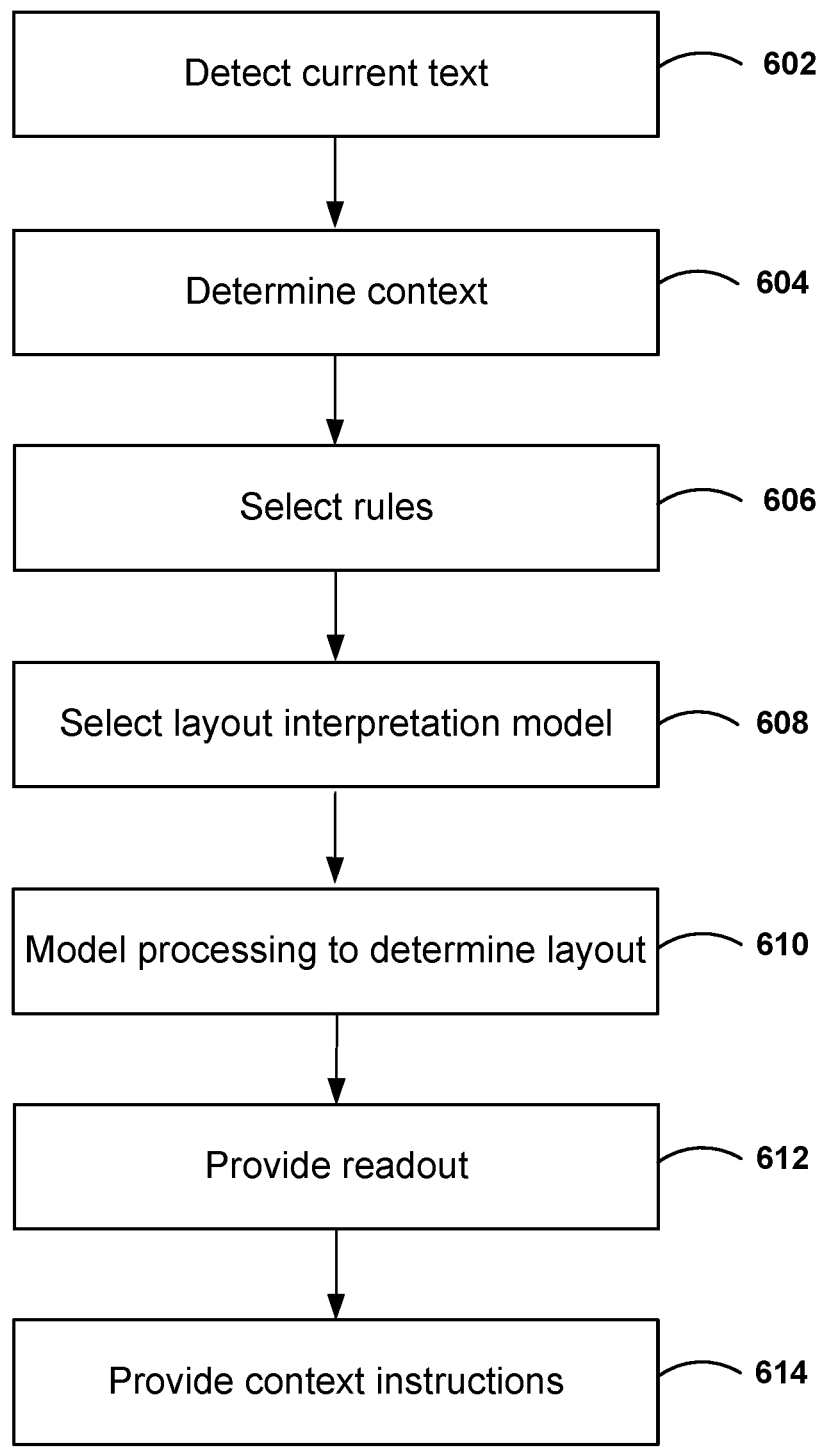
FIG. 6 is a more detailed flowchart illustrating example techniques for deploying a model using the training techniques of FIGS. 1, 2, and 5.

FIG. 6 is a more detailed flowchart illustrating example techniques for deploying a model using the training techniques of FIGS. 1, 2, and 5. In the example of FIG. 6, current text 112 to be read may be detected (602). The current text 112 may be recognized in response to any of the factors, or using any of the techniques, mentioned above with respect to the training text 104. For example, the text reader 110 may have access to a camera that detects a prolonged gaze (e.g., exceeding a gaze threshold) of a user on the current text 112, or on a physical item (such as a sign) that may contain the current text 112. Current text detection may occur in response to a user initiation, or through other sensor or I/O functionality of the text reader 110.

For example, a blind or low-vision user may be unable or unlikely to gaze directly at the current text 112, even when the user is in a vicinity thereof and would benefit from knowledge of the current text. For example, such a user may be in a vicinity of a sign providing needed directions.

In such cases, and similar cases, various detection techniques may be used to initiate recognition of the current text 112. For example, the text reader 110, e.g., the context engine 142, may determine that the nearby sign is typically read by a large number or percentage of users who approach the sign (e.g., are within a certain distance of the sign, as determined by GPS or through the use of cloud anchors or other location techniques), or that the sign is of a type that provides certain types of useful information (e.g., directions). In these ways, any user who may otherwise be unable or unlikely to notice or benefit from a sign or other current text, may nonetheless be provided with the text thereon.

In other examples, a user may provide a category or type of current text of interest, and current text detection may be focused accordingly. For example, a user may indicate an interest in street signs, and current text detection may be initiated with respect to street signs, but not with respect to advertisements and other content. In other cases, a user may provide a hand gesture detected by smart glasses, such as pointing to the current text 112. In still other case, inertial measurement unit (IMU) data may be used, such as a user tilting his or her head, or standing still for a predetermined amount of time.

Context may be determined (604), such as by the context engine 142. As referenced above, although context determination is illustrated following current text detection, it may occur that context determination occurs concurrently with, or prior to, current text detection. Context determination may be based on simple rules, or based on separate machine learning algorithms that classify context, e.g., based on training performed using the collected validation data 136.

For example, context determination may include a classification of a location of user and of the current text 112, such as identifying that the current text 112 is located within a store, or on a street, or in another type of location. Context may be determined broadly, or may be highly-specific. For example, a specific type of store (e.g., grocery store) may be determined, or a specific store at a specific location may be determined.

In some instances, when context is sufficiently specific, it may be possible to retrieve previously-stored gaze data for that context to use in providing text readouts. For example, if a first user visits the grocery store of FIG. 3 and the aisle sign 300 is used as training text 104, a second user may later visit the same grocery store and view the aisle sign 300 as current text 112. Then, the text reader 110 may either implement a suitable layout interpretation model, or may simply retrieve the previously-determined gaze data from the first user in order to perform text readout.

Rules may then be selected (606), e.g., for determining which layout interpretation model(s) 140 to use, and how to use the determined layout interpretation model(s) 140. For example, a determined context may be the basis for a rule for selecting a particular layout interpretation model, based thereon.

For example, the rules may define or identify templates associated with particular layout interpretation model(s) 140, that are determined to be likely to correspond to the current text 112 and determined context thereof. For example, a road sign template may be selected when the context is determined to include road navigation.

The rules may further determine a manner in which text readout occurs, and whether associated context instructions are provided. Examples of such rules are referenced above, and provide in more detail, below.

The layout interpretation model may be selected (608), e.g., based on the context and/or the rules. In some cases, two or more applicable layout interpretation models may be selected, to increase an accuracy and reliability of a resulting text readout.

Readout of the current text 112 may be provided (612), perhaps together with providing associated context instructions (614). For example, as described above, readout may occur audibly through TTS, or provided visually through rearranging a word order of the current text on a display available to the user.

In some cases, the text readout may not be provided directly to the user. For example, the output generator 148 may stored the read text within a search corpus, or within an editable document. In other examples, the text may be processed by the text reader 110, but the user may simply be provided with a corresponding context instruction, such as "proceed straight ahead."

More generally, the context instructions may include any additional information that may be provided with, or based on, the current text 112, and that may be useful in utilizing the current text 112. The context instructions may be provided by the context engine, based on the rules of the rules engine, as referenced above. For example, relevant rules may state that when using a particular layout interpretation model in a particular context, a specified context instruction should also be provided. In the examples given above for a grocery store in conjunction with FIG. 3, a user may be provided with a readout of the aisle sign 300, along with context instructions directing the user as to how to proceed with respect to read aisle sign 300.

For example, a user may provide a query, such as, "where is Gatorade?" within a grocery store. In the example of FIG. 3, the text reader 110 will determine a current context of a grocery store, identify all visible aisle signs using appropriate rules and associated templates, and will interpret all detected aisle signs using an identified layout interpretation model(s) 140. Alternatively, the text reader 110 may determine that all such aisle sign data has previously been determined from previous users, and may query against that data.

Once the text reader 110 has determined that Gatorade is on a left side of aisle 3, between the juice and the hot cocoa, the output generator 148 may provide audible context instructions, such as, "proceed to aisle three and look for Gatorade on a left-hand side of the aisle, between the juice and the hot cocoa."

Many other techniques for interpretation and readout of the current text 112 may be utilized. For example, interpretation and readout may take into account aspects of the layout such as use of large or bolded font to emphasize particular words, or increased/decreased word spacing to indicate pauses between words. In such cases, for example, an audible readout may alter an enunciation or volume for such words to provide an accurate or intended readout.

Figure 7:
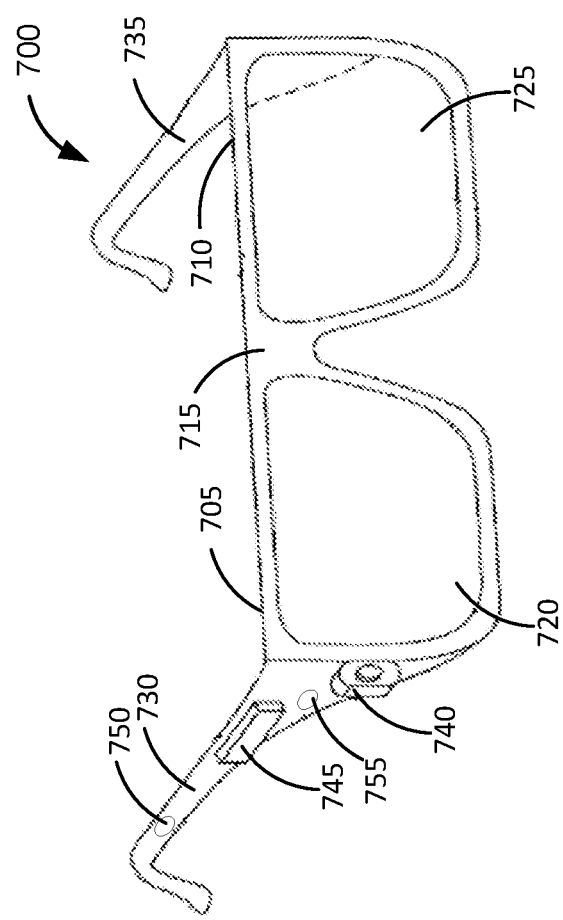
FIG. 7 illustrates an example pair of smart glasses that may be used with the system of FIG. 1.

FIG. 7 illustrates an example pair of smart glasses 700 that may be used with the system of FIG. 1. As shown in FIG. 7, smart glasses 700 includes lens frame 705, lens frame 710, center frame support 715, lens element 720, lens element 725, extending side-arm 730, extending side-arm 735, image capture device 740 (e.g., a camera), on-board computing system 745, speaker 750, and microphone 755.

Each of the frame elements 705, 710, and 715 and the extending side-arms 730, 735 can be formed of a solid structure of plastic and/or metal, or can be formed of a hollow structure of similar material so as to allow wiring and component interconnects to be internally routed through the smart glasses 700. Other materials can be possible as well. At least one of the lens elements 720, 725 can be formed of any material that can suitably display a projected image or graphic. Each of the lens elements 720, 725 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 715 and the extending side-arms 730, 735 are configured to secure the smart glasses 700 to a user's face via a user's nose and ears, respectively. The extending side-arms 730, 735 can each be projections that extend away from the lens-frames 705, 710, respectively, and can be positioned behind a user's ears to secure the smart glasses 700 to the user. The extending side-arms 730, 735 can further secure the smart glasses 700 to the user by extending around a rear portion of the user's head. Additionally, or alternatively, for example, the smart glasses 700 can connect to or be affixed within a head-mounted helmet structure. Other configurations for wearable glasses are also possible.

The on-board computing system 745 is shown to be positioned on the extending side-arm 730 of the smart glasses 700; however, the on-board computing system 745 can be provided on other parts of the smart glasses 700 or can be remotely positioned from the smart glasses 700 (e.g., the on-board computing system 745 could be wire- or wirelessly-connected to the smart glasses 700). The on-board computing system 745 can include a processor and memory, for example. The on-board computing system 745 can be configured to receive and analyze data from the image capture device 740 (and possibly from other sensory devices) and generate images for output by the lens elements 720, 725.

The image capture device 740 can be, for example, a camera that is configured to capture still images and/or to capture video. In the illustrated configuration, image capture device 740 is positioned on the extending side-arm 730 of the smart glasses 700; however, the image capture device 740 can be provided on other parts of the smart glasses 700. The image capture device 740 can be configured to capture images at various resolutions or at different frame rates. Many image capture devices with a small form-factor, such as the cameras used in mobile phones or webcams, for example, can be incorporated into an example of the smart glasses 700.

One image capture device 740 is illustrated. However, more image capture devices can be used, and each can be configured to capture the same view, or to capture different views. For example, the image capture device 740 can be forward facing to capture at least a portion of the real-world view perceived by the user. This forward-facing image captured by the image capture device 740 can then be used to generate an augmented reality where computer generated images appear to interact with or overlay the real-world view perceived by the user.

Smart glasses 700 can be used to (e.g., the on-board computing system 745) interpret certain gestures (e.g., by a wearer's hand or hands) as user input. For example, smart glasses 700 can capture hand gestures by analyzing image data from image capture device 740, and initiate tasks that are defined as corresponding to certain gestures. Further, speaker 750 and microphone 755 can be used as input/output components. For example, the microphone 755 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

In some implementations, the smart glasses 700 can determine a user's intent, such as an intent to authenticate as described herein. In some implementations, it should be noted that the smart glasses 700 may determine user's intent based on a combination of hand gestures and verbal commands from a digital assistant.

It will be appreciated that although various example implementations have been described, many other implementations and associated aspects are possible, as well. For example, machine learning techniques (e.g., training techniques) may be applied in a multi-tiered manner. For example, training may be performed with respect to a single, commonly-seen sign (e.g., a sign in Times Square or other densely-populated area), or, conversely, may be performed by aggregating the same or similar signs (e.g., common highway signs) across multiple, more sparsely-populated areas. Further, gaze tracking, including tracking a gaze order, a gaze duration, or other gaze aspects, may be performed using other techniques than those mentioned above by way of example. For example, gaze tracking data may be acquired through compensating users, in which case a relatively smaller number of users may be required to collect many instances of training data. Also, in some implementations, portions of collected training data determined to be potentially private or otherwise sensitive may be intentionally blurred or otherwise excluded. For example, participating users may be provided with an opportunity to select or designate information, or types of information, to be excluded.

Figure 8:
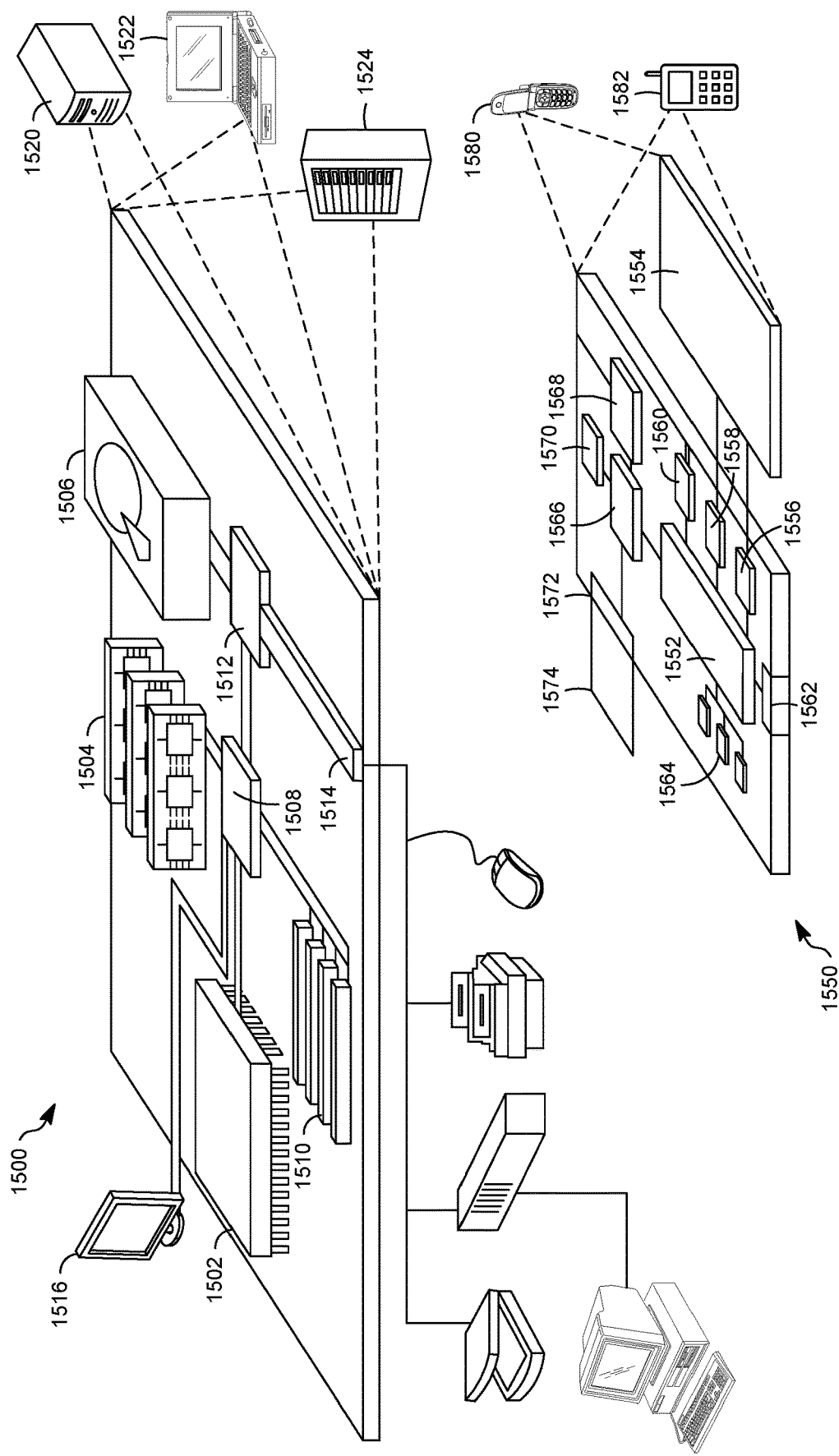
FIG. 8 shows an example of a computer device and a mobile computer device according to at least one example embodiment.

FIG. 8 shows an example of a computer device 1500 and a mobile computer device 1550, which can be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and wearable devices such as wearable glasses, head-mounted devices (HMDs), smartwatches, fitness trackers, smart rings, smart clothing, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and can be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses can be used, as appropriate, along with multiple memories and types of memory. Also, multiple computing devices 1500 can be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1500 can be implemented in a number of different forms, as shown in the figure. For example, it can be implemented as a standard server 1520, or multiple times in a group of such servers. It may also be implemented as part of a rack server system 1524. In addition, it can be implemented in a personal computer such as a laptop computer 1522. Alternatively, components from computing device 1500 can be combined with other components in a mobile device (not shown), such as device 1550. Each of such devices may contain one or more of computing device 1500, 1550, and an entire system can be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components can be mounted on a common motherboard or in other manners as appropriate.

The processor 1552 can execute instructions within the computing device 1550, including instructions stored in the memory 1564. The processor can be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 can be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 can be provide in communication with processor 1552, to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 can be provide as a security module for device 1550, and can be programmed with instructions that permit secure use of device 1550. In addition, secure applications can be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that can be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, Wi-Fi, or other such transceiver (not shown). In addition, GPS (Global Positioning System) receiver module 1570 may provide additional navigation- and location-related wireless data to device 1550, which can be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 can be implemented in a number of different forms, as shown in the figure. For example, it can be implemented as a cellular telephone 1580. It may also be implemented as part of a smart phone 1582, personal digital assistant, or other similar mobile device.

Thus, implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s)

described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   determine, from a head-mounted device (HMD), text that includes words arranged according to a layout having a displayed order of the words, the layout being arranged to visually indicate location-based information with respect to at least one item that is physically proximate to the text;
   determine, using a layout interpretation model, an output order of at least a subset of the words of the text based on the text, the layout, and a physical location of the text, the output order being different from the displayed order; and
   output, using the HMD and based on the physical location, the at least the subset of the words of the text in the output order and based on the layout, and conveying the location-based information with respect to the at least one item.

2. The computer program product of claim 1, wherein the instructions, when executed, are further configured to cause the at least one computing device to:
   determine the text based on gaze data detected by the HMD with respect to the text and exceeding a gaze threshold.

3. The computer program product of claim 1, wherein the instructions, when executed, are further configured to cause the at least one computing device to:
   determine the text based on a physical gesture of a user with respect to the text, as detected by the HMD.

4. The computer program product of claim 1, wherein the instructions, when executed, are further configured to cause the at least one computing device to:
   perform a classification of a sign containing the text; and
   determine the text based on the classification of the sign.

5. The computer program product of claim 1, wherein the instructions, when executed, are further configured to cause the at least one computing device to:
   determine the text using the physical location.

6. The computer program product of claim 1, wherein the instructions, when executed, are further configured to cause the at least one computing device to:
   determine the physical location including classifying the physical location by type as one of a predetermined number of location types.

7. The computer program product of claim 1, wherein the instructions, when executed, are further configured to cause the at least one computing device to:
   determine the physical location using Global Positioning System (GPS) coordinates.

8. The computer program product of claim 1, wherein the instructions, when executed, are further configured to cause the at least one computing device to:
   output the at least the subset of the words of the text with the location-based information providing directional instructions with respect to the item at the physical location.

9. The computer program product of claim 1, wherein HMD includes a pair of smart glasses.

10. A computer-implemented method, the method comprising:
- determining, from a head-mounted device (HMD), text that includes words arranged according to a layout having a displayed order of the words, the layout being arranged to visually indicate location-based information with respect to at least one item that is physically proximate to the text;
- determining, using a layout interpretation model, an output order of at least a subset of the words of the text based on the text, the layout, and a physical location of the text, the output order being different from the displayed order; and
- outputting, using the HMD and based on the physical location, the at least the subset of the words of the text in the output order and based on to the layout and conveying the location-based information with respect to the at least one item.

11. The method of claim 10, further comprising:
determining the text based on gaze data detected by the HMD with respect to the text and exceeding a gaze threshold.

12. The method of claim 10, further comprising:
determining the text based on a physical gesture of a user with respect to the text, as detected by the HMD.

13. The method of claim 10, further comprising:
determining the text using the physical location.

14. The method of claim 10, further comprising:
determining the physical location including classifying the physical location by type as one of a predetermined number of location types.

15. The method of claim 10, further comprising:
outputting the at least the subset of the words of the text with the location-based information providing directional instructions with respect to the item at the physical location.

16. A head-mounted device (HMD) comprising:
at least one memory including instructions; and
at least one processor that is operably coupled to the at least one memory and that is arranged and configured to execute instructions that, when executed, cause the HMD to
- determine text that includes words arranged according to a layout having a displayed order of the words, the layout being arranged to visually indicate location-based information with respect to at least one item that is physically proximate to the text;
- determine, using a layout interpretation model, an output order of at least a subset of the words of the text based on the text, the layout, and a physical location of the text, the output order being different from the displayed order; and
- output, based on the physical location, the at least the subset of the words of the text in the output order and based on the layout, and conveying the location-based information with respect to the at least one item.

17. The HMD of claim 16, wherein the HMD is further configured to:
determine the text using the physical location.

18. The HMD of claim 16, wherein the HMD is further configured to:
determine the physical location including classifying the physical location by type as one of a predetermined number of location types.

19. The HMD of claim 16, wherein the HMD is further configured to:
output the at least the subset of the words of the text with the location-based information providing directional instructions with respect to the item at the physical location.

* * * * *